United States Patent [19]

Yoneda et al.

[11] 4,346,615

[45] Aug. 31, 1982

[54] STARTING DEVICE FOR AN ENGINE

[75] Inventors: Tadao Yoneda; Michinori Tsunoda, both of Fukaya, Japan

[73] Assignee: Sawafuji Denki Kabushiki Kaisha, Tokyo, Japan

[21] Appl. No.: 135,854

[22] Filed: Mar. 28, 1980

[30] Foreign Application Priority Data

Dec. 24, 1979 [JP] Japan ................................ 54-167801

[51] Int. Cl.³ ........................ F02N 15/06; F16D 43/06

[52] U.S. Cl. ........................................ 74/7 A; 74/7 R; 74/7 E; 192/114 R

[58] Field of Search ..................... 74/6, 7 R, 7 A, 7 C, 74/7 E; 192/114 R, 42

[56] References Cited

U.S. PATENT DOCUMENTS 3,319,755 5/1967 Digby .................................. 74/7 R 3,915,020 10/1975 Johnson .......................... 192/114 R

FOREIGN PATENT DOCUMENTS 939846 3/1956 Fed. Rep. of Germany .

*Primary Examiner*—Allan D. Herrmann

*Attorney, Agent, or Firm*—Armstrong, Nikaido, Marmelstein & Kubovcik

[57] ABSTRACT

A starting device for an engine wherein a drive shaft associated with a starting motor is connected through a one-way clutch to a pinion gear for driving a ring gear of the engine. The device comprises a first sleeve slidably fitted on the drive shaft, a second sleeve slidably fitted on the first sleeve, a drive clutch member for the one-way clutch slidably fitted on the second sleeve, and a buffer spring between the first sleeve and the one-way clutch. The first helical spline between the drive shaft and the first sleeve imparts a great forward thrust to the pinion gear by utilization of the turning force of the drive shaft into complete engagement with the ring gear so as to positively drive the latter. An excessive load may be absorbed by compressive deformation of the buffer spring.

10 Claims, 2 Drawing Figures

STARTING DEVICE FOR AN ENGINE

BACKGROUND AND SUMMARY OF THE INVENTION

The present invention relates to a starting device for an engine in which a drive shaft associated with a starting motor is connected through a one-way clutch to a pinion gear for driving a ring gear of the engine. It is an object of the invention to provide a simple and effective starting device as described wherein if at the time of start, engagement between the pinion gear and the ring gear is improper, such engagement can be brought into a proper condition by the utilization of a turning force of the drive shaft, and if an excessive load is applied to the pinion gear, such a load can be absorbed to prevent the pinion gear and other transmission members from being damaged due to the excessive load.

DESCRIPTION OF THE PREFERRED EMBODIMENTS

Figure 1:
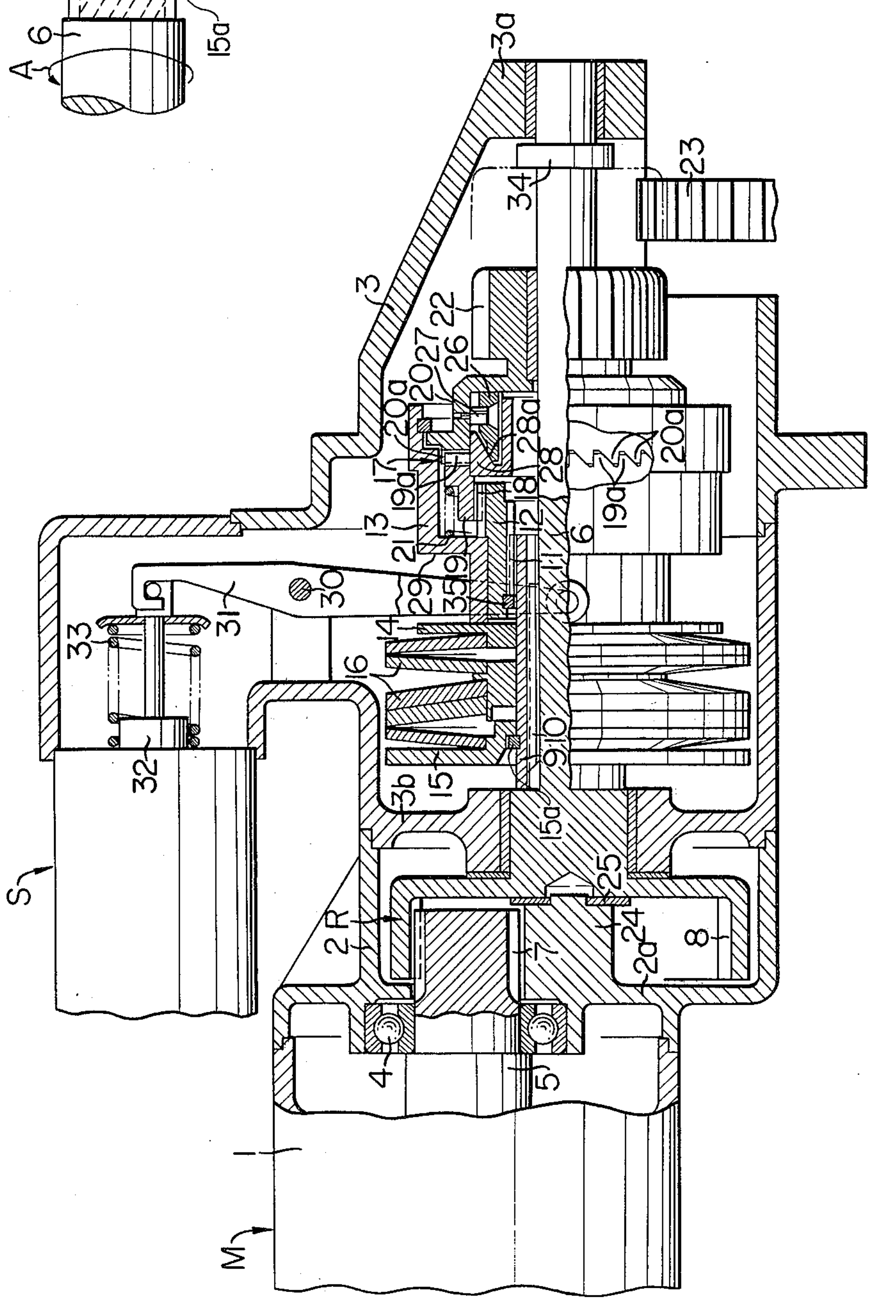
FIG. 1 is a longitudinal sectional side view of the device in accordance with one embodiment of the present invention.

Referring now to FIG. 1, which shows one embodiment of the present invention, there is shown a device which comprises a starting motor M having a stator casing 1, a reducing casing 2 coupled to the front end of the stator casing, a pinion casing 3 coupled to the front end of the reducing casing, a rotor shaft 5 of the starting motor M supported on a rear end wall 2*a* of the reducing casing 2 through a ball bearing 4, and a drive shaft 6 parallel to the rotor shaft 5 supported on both front and rear end walls 3*a* and 3*b* of the pinion casing 3.

In the reducing casing 2, a small-diameter drive gear 7 is disposed on the front end of the rotor shaft 5, and a large-diameter internal driven gear 8 meshed with the drive gear 7 is integrally connected to the drive shaft 6, these gears 7 and 8 constituting a reduction gear R.

A first sleeve 9 is slidably fitted over the outer periphery of the drive shaft 6 through a first helical spline 10, a second sleeve 12 is slidably fitted over the outer periphery of the first sleeve 9 through a second helical spline 11, and a rear end of a cylindrical clutch case 13 is fitted over the outer peripheral portion of the second sleeve 12. A buffer spring 16 composed of a plurality of belleville springs is compressibly retained between a spring seat 14, slidably fitted on the outer periphery of the first sleeve and bearing on the rear end of the clutch case 13, and a spring seat 15 secured by a retainer ring 15*a* to the rear end of the first sleeve 9.

The clutch case 13 accommodates therein a one-way clutch 17 for stopping a transmission function when subjected to a reverse load. The clutch 17 comprises a drive clutch member 19 slidably fitted on the outer periphery of the front end of the second sleeve 12 through a third helical spline 18, a driven clutch member 20 rotatably connected to the inner wall of the clutch case 13, and a clutch spring 21 for biasing the drive clutch member 19 in a direction engaging the driven clutch member 20. Both clutch members 19 and 20 have saw-tooth like clutch teeth 19*a* and 20*a*, respectively, which engage with each other at their opposed surfaces. The rear end of the spline 11 of the first sleeve 9 is opposed to a stop ring 35 secured to the inner peripheral surface of the second sleeve 12 in order to control the advancing limit of the second sleeve 12 to the first sleeve 9 whereas the rear end of the spline 18 on the second sleeve 12 is opposed to the rear end wall of the clutch case 13 in order to control the advancing limit of the clutch case 13 to the second sleeve 12.

Forwardly of the driven clutch member 20 is integrally associated with a pinion gear 22, which is rotatably and slidably fitted on the drive shaft 6, and a ring gear 23 of the engine is disposed ahead of the pinion gear 22 so that the ring gear 23 comes to mesh with the pinion gear 22 when the latter advances.

Figure 2:
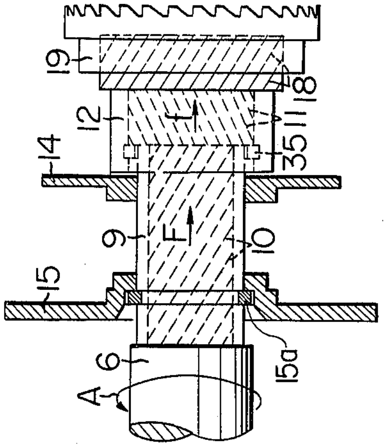
FIG. 2 is a plan view showing a state in which a drive shaft, sleeves and a drive clutch are fitted one another through helical splines.

With the construction as described above, the first helical spline 10 is formed right-hand screwwise so as to produce a thrust in a direction of the ring gear 23 with respect to the first sleeve 9 by means of the turning force A of the drive shaft 6, as shown in FIG. 2, and a relatively small lead angle (for example, 60°) is provided so that the great thrust may be produced.

The second helical spline 11 is formed left-hand screwwise so as to produce a thrust in a direction of the ring gear with respect to the first sleeve 9 by means of the turning force A of the first sleeve 9, and a relatively large lead angle (for example, 70°) is provided.

The third helical spline 18 is formed helically in the same direction as the first helical spline 10, and the same lead angle is provided. Accordingly, the turning force A of the second sleeve 12 imparts a thrust in a direction of the ring gear 23 to the drive clutch member 19. A projected shaft 24 disposed at the rear end wall 2*a* of the reducing casing 2 is permitted to bear on the rear end of the drive shaft 6 through a thrust washer 25 in order to control axial withdrawal of the drive shaft 6 by reaction which occurs when the thrust of the first helical spline 10 is produced.

The driven clutch member 20 is internally provided with a plurality of centrifugal weights 26 (one of which is shown in the figure) which are supported by means of a pin 27 so that they may be moved in a radial direction, and an operating ring 28 having a tapered surface 28*a* engaging these weights is fitted into the drive clutch member 19.

A lower end of a shift fork 31 journalled at 30 on the pinion casing 3 engages an annular groove 29 defined by the clutch case 13 and the spring seat 14, and the shift fork has its upper end to which is connected a movable core 32 of an electromagnetic switch S for the starting motor M, which is positioned on one side of the casing 3, and a return spring 33 for biasing the shift fork 31 in a retracting direction of the clutch case 13. The electromagnetic switch S is well-known, and the detailed explanation thereof will not be given.

In FIG. 1, reference numeral 34 designates a stopper for determining the advance position of the pinion gear 22.

The operation of the embodiment will be described hereinafter.

When the starting switch is closed to energize a solenoid of the electromagnetic switch S, the movable core 32 is moved rearward (leftward in the figure) by the action of the magnetic force of the solenoid against the spring force of the return spring 33, the clutch case 13 along with the first sleeve 9 is shifted frontwardly (rightward in the figure) through the shift fork 31 and the pinion gear 22 is advanced to a position (as indicated by the dash-dotted contour lines) where the pinion gear meshes with the ring gear 23.

The contact within the electromagnetic switch S is closed nearly simultaneously with engagement of the pinion gear 22 with the ring gear 23 to start the starting motor M and thus the rotor shaft 5 thereof rotates. This rotation of the rotor shaft 5 is increased in torque by the reduction gear R and transmitted to the drive shaft 6 and further transmitted to the first sleeve 9, the second sleeve 12, the drive clutch member 19, the driven clutch member 20 and the pinion gear 22 to drive the ring gear 23, thus cranking the engine.

During that time, the first helical spline 10 imparts the first sleeve 9 a thrust in a direction of the ring gear 23 in accordance with the turning force of the drive shaft 6, and so, if the engagement between the pinion gear 22 and the ring gear 23 is improper, the thrust powerfully exerts on the pinion gear 22 through the first sleeve 9, the buffer spring 16 and the clutch case 13 and as a consequence, the pinion gear 22 is automatically forced forward to the advance limit at which the gear is stopped by the stopper 34 for complete engagement with the ring gear 23. Therafter, due to the integral rotation of the first and second sleeves, 9 and 12, drive clutch member 19 is urged by the third helical spline 18 against the driven clutch member 20 to provide a positive engagement between the clutch teeth **19*a* and 20*a*** thereof.

On the other hand, when excessive rotational vibrations occur in the crank shaft due to the irregular explosion of the engine during the cranking and the reverse component thereof is turned into an excessive load to exert on the pinion gear 22 from the ring gear 23, the load is then absorbed by the buffer spring 16 in a manner as described below.

That is, when the turning force is applied to the drive shaft 6 with the pinion gear 22 stopped by the stopper 34 so as not to effect further advancement thereof, the first helical spline 10 imparts to the first sleeve 9 a forward thrust F, of which reaction F is carried by the projected shaft 24 through the drive shaft 6. Further, the turning force transmitted from the drive shaft 6 to the first sleeve 9 causes the second helical spline 11 to impart similarly to the first sleeve 9 a forward thrust f, of which reaction $-f$ is carried by the clutch case 13 through the second sleeve 12, and after all, the forward thrust $F+f$ exerts on the first sleeve 9. In other words, rotation of the first sleeve 9 imparts a backward or leftwards thrust f to the second sleeve 12 under the action of the second helical spline 11, whereby the buffer spring 16 is subjected to a compressive force $F+f$, of which component F is due to the first helical spline 10 and the component f is due to the second helical spline 11. If the drive force of the drive shaft 6 and the first sleeve 9 increases as the load applied to the pinion gear 22 increases, the thrust $F+f$ also increases, and when the value of $F+f$ exceeds a given level, the sleeve 9 moves forward (rightward in the figure) against the set load of the buffer spring 16 to compress the latter so that the aforementioned excessive load is absorbed by compressed deformation of the buffer spring 16.

When the engine starts and the ring gear 23 continuously rotates at a speed higher than that of the pinion gear 22, both the clutch teeth **19*a* and 20*a* of the one-way clutch 17 first slidably move each other so as to retract the drive clutch member 19 against the clutch spring 21. Next, when the rotational speed of the pinion gear 22 increases more than a given level, the centrifugal weight 26 which is rotated along with the driven clutch member 20 is slidably moved by its own centrifugal force in a radial direction along the pin 27 to urge the tapered surface 28*a* of the operating ring 28 and to retract the same thereby maintaining the drive clutch member 19 in its retracted position and maintaining the one-way clutch 17** in open state to prevent the overrun of the motor M which otherwise might be caused by a reverse load from the engine.

Immediately thereafter, when the starting switch is opened to render the electromagnetic switch S ineffective, the starting motor M stops and the shift fork 31 causes the clutch case 13 to return to its retracted position as shown by means of the spring force of the return spring 33 with the result that the pinion gear 22 is disengaged from the ring gear 23, the centrifugal weight 26 loses its centrifugal force and the one-way clutch 17 is returned into its engaging condition by the spring force of the clutch spring 21.

As described above, in accordance with the present invention, when the engine starts, the first helical spline between the drive shaft and the first sleeve imparts the pinion gear a great forward thrust by utilization of the turning force of the drive shaft into complete engagement with the ring gear, whereby the ring gear may be positively driven.

Further, when the excessive load is applied to the pinion gear, the sum of the produced thrust of the first helical spline and the produced thrust of the second helical spline between the first and second sleeves causes deformation of the buffer spring on the first sleeve. With this arrangement, the lead angle of the first and second helical splines is made large whereby even if the individual produced thrusts are small, the great forward thrust may be imparted positively to the buffer spring to absorb the aforementiond excessive load. Accordingly, it is possible to positively protect the pinion gear and other transmission members from damages caused by the excessive loads. Moreover, since the lead angles of both the helical splines may be formed large as described above, it is not only possible to manufacture the helical splines easily but to decrease the thrust load applied to the thrust bearing of the drive shaft as the first helical spline operates, thus contributing to the increase in the durability of the thrust bearing.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, therefore, such adaptations should and are intended to be comprehended within the meaning and range of equivalence of the following claims.

What is claimed is:

1. In a starting device for an engine in which a drive shaft coupled with a starting motor is connected to a pinion gear through a one-way clutch having a pair of drive and driven clutch members for driving a ring gear of the engine, the improvement comprising a first sleeve slidably fitted over said drive shaft through a first helical spline, said first spline acting to impart to said first sleeve a thrust in a direction toward said ring gear upon rotation of said drive shaft, a second sleeve slidably fitted over said first sleeve through a second helical spline, said second spline acting to impart to said first sleeve a further thrust in a direction toward said ring gear upon rotation of said first sleeve, said drive clutch member of said one-way clutch slidably fitted over said second sleeve through a third helical spline having a helical angle in the same direction as the first helical spline, and a buffer spring interposed between said first sleeve and said one-way clutch so as to be deformable for absorbing an excessive load transmitted from said ring gear to said one-way clutch.

2. A starting device for an engine as defined in claim 1, wherein said one-way clutch further comprises a clutch casing fitted over an outer peripheral portion of said second sleeve to accommodate therein said drive and driven clutch members, and a spring means disposed between said clutch casing and said drive clutch member for biasing said drive clutch member in a direction to engage said driven clutch, and wherein said buffer spring is compressibly disposed between a first spring seat slidably fitted over the outer peripheral portion of said first sleeve and a second spring seat secured to the outer peripheral portion of said first sleeve at a location axially spaced apart from said first spring seat.

3. A starting device for an engine as defined in claim 2, wherein said buffer spring comprises a plurality of bellville springs.

4. In a starting device for an engine having a driven gear in which a drive shaft coupled with a starting motor is operatively connected to a pinion gear through a one-way clutch having a pair of drive and driven clutch members for unidirectionally driving the engine driven gear, the improvement comprising a first sleeve mounted on said drive shaft through a first helical spline, said first helical spline acting to impart to said first sleeve a thrust in a direction toward said engine driven gear upon rotation of said drive shaft, a second sleeve mounted on said first sleeve through a second helical spline, said second helical spline acting to impart to said second sleeve a thrust in a direction away from said engine driven gear upon rotation of said first sleeve, said drive clutch member of said one-way clutch being mounted on said second sleeve through a third helical spline such that it is moved toward said driven clurch member under the action of said third helical spline upon rotation of said second sleeve, and a buffer spring for absorbing an excessive load transmitted from said engine driven gear toward said drive shaft.

5. A starting device for an engine as defined in claim 4 wherein said second helical spline has a helical angle in the opposite direction to said first helical spline.

6. A starting device for an engine as defined in claim 4 wherein said third helical spline has a helical angle in the same direction as said first helical spline.

7. A starting device for an engine as defined in claim 4 wherein said one-way clutch further comprises a clutch casing slidably mounted on said second sleeve for accommodating therein said drive and driven clutch members, and a spring disposed between said clutch casing and said drive clutch member for biasing said drive clutch member in a direction to engage said driven clutch member.

8. A starting device for an engine as defined in claim 4 wherein said buffer spring is disposed between said first sleeve and said second sleeve.

9. A starting device for an engine as defined in claim 8 wherein said buffer spring is disposed between a first spring seat secured to said first sleeve and a second spring seat slidably mounted on said first sleeve, said second spring seat operatively connected to said second sleeve.

10. A starting device for an engine as defined in claim 9 wherein said buffer spring comprises bellville springs.

* * * * *